United States Patent
Yamazoe et al.

(10) Patent No.: US 7,902,961 B2
(45) Date of Patent: Mar. 8, 2011

(54) RFID SYSTEM AND READER WRITER

(75) Inventors: Takanori Yamazoe, Hadano (JP);
Masaaki Yamamoto, Kokubunji (JP);
Toshiyuki Kuwana, Yokohama (JP)

(73) Assignee: Hitachi, Ltd., Chiyoda-ku, Tokyo (JP)

( * ) Notice: Subject to any disclaimer, the term of this patent is extended or adjusted under 35 U.S.C. 154(b) by 763 days.

(21) Appl. No.: 11/822,397

(22) Filed: Jul. 5, 2007

(65) Prior Publication Data

US 2008/0018430 A1 Jan. 24, 2008

(30) Foreign Application Priority Data

Jul. 7, 2006 (JP) .................................. 2006-188190

(51) Int. Cl.
*H04Q 5/22* (2006.01)
*G08B 13/14* (2006.01)

(52) U.S. Cl. ..................................... 340/10.1; 340/572.2

(58) Field of Classification Search ................. 340/10.4, 340/572.2, 10.1
See application file for complete search history.

(56) References Cited

U.S. PATENT DOCUMENTS

| | | | |
|---|---|---|---|
| 3,790,945 A * | 2/1974 | Fearon | 340/572.2 |
| 4,302,846 A * | 11/1981 | Stephen et al. | 455/19 |
| 4,471,344 A * | 9/1984 | Williams | 340/572.2 |
| 4,724,427 A * | 2/1988 | Carroll | 340/572.1 |
| 6,163,579 A * | 12/2000 | Harrington et al. | 375/257 |
| 6,549,064 B2 * | 4/2003 | Bandy et al. | 327/536 |
| 6,856,275 B1 * | 2/2005 | Ehlers et al. | 342/42 |
| 2005/0242954 A1 * | 11/2005 | Franklin et al. | 340/572.2 |
| 2007/0046468 A1 * | 3/2007 | Davis | 340/572.1 |
| 2007/0152833 A1 * | 7/2007 | Kaplan et al. | 340/572.8 |

FOREIGN PATENT DOCUMENTS

| | | |
|---|---|---|
| JP | 62-277580 | 5/1986 |
| JP | 8-180223 | 12/1994 |
| JP | 2005-530369 | 12/2002 |
| JP | 2005-351878 | 7/2004 |
| WO | WO 03/058550 A1 | 12/2002 |

OTHER PUBLICATIONS

Japanese Office Action from Japanese Patent Office dated Jul. 8, 2008 for Japanese Application No. 2006-188190 in Japanese language.
Japanese Office Action from Japanese Patent Office dated Jun. 30, 2008 for Japanese Application No. 2006-188190 in English.

* cited by examiner

*Primary Examiner* — Benjamin C Lee
*Assistant Examiner* — Cal Eustaquio
(74) *Attorney, Agent, or Firm* — Stites & Harbison PLLC; Juan Carlos A. Marquez, Esq.

(57) ABSTRACT

A technology for detecting an RFID by a reader writer and transmitting harmonics for reading and writing the RFID timely without using an object detection sensor is provided. Using a nonlinearity of a rectifier or a demodulator in an IC chip of the RFID, a continuous wave or a modulated wave of two or more different frequencies is output from the reader writer. The RFID receives the continuous wave or the modulated wave of two or more different frequencies and the reader writer receives harmonics intermodulation generated by the rectifier or the demodulator in the IC chip. Therefore, the RFID can be detected without any special object detection sensor, and a modulated wave for reading or writing the RFID can be transmitted.

4 Claims, 13 Drawing Sheets

TOP VIEW

SIDE VIEW

US 7,902,961 B2

RFID SYSTEM AND READER WRITER

CROSS-REFERENCE TO RELATED APPLICATION

The present application claims priority from Japanese Patent Application No. JP 2006-188190 filed on Jul. 7, 2006, the content of which is hereby incorporated by reference into this application.

TECHNICAL FIELD OF THE INVENTION

The present invention relates to an RFID (Radio Frequency Identification) technology, and more particularly to a technology effective in an application to an RFID detection technology.

BACKGROUND OF THE INVENTION

As related art examined by inventors of the present invention, for example, there is a technology in which a plurality of directional antennas receive signals of RFID to detect a location of the RFID in an RFID detection technology. (See Japanese Patent Application Laid-Open Publication No. 2005-351878 (Patent Document 1), for example.)

SUMMARY OF THE INVENTION

An RFID system performing a read operation and a write operation of data stored in an RFID (an IC card, a wireless tag and the like) through radio communication is, in general, composed of a terminal (interrogator) referred to as a reader writer and a plurality of RFIDs (responsers) 201, as shown in FIG. 1A. Each RFID 201 is composed of an IC chip 210, an antenna 220 and the like, as shown in FIG. 1B. A reader writer 101 transmits continuous or modulated waves to the RFID 201. The RFID 201 receives and demodulates the electromagnetic waves transmitted from the reader writer 101, and re-transmits based on stored data as necessary. The reader writer 101 receives and demodulates the re-transmitted wave.

The RFID system is often used for purposes of physical distribution and circulation. For example, applications such as a case in which an RFID attached to a pallet, a case, a cardboard box or the like of an item 303 loaded on a forklift truck 302 is read and written by a reader writer as shown in FIG. 2 and a case in which an RFID attached to item 303 being brought by a belt conveyor 304 is read and written as shown in FIG. 3 are considered.

At present, in the case of reading and writing RFIDs attached to items brought periodically at certain intervals, a reader writer only needs to transmit modulated wave data periodically for reading and writing the RFID. However, in the case where RFIDs are brought nonperiodically, the reader writer sometimes cannot read or write the RFID because of a mistimed transmission of the modulated wave data. The situations are shown in FIGS. 4A to 4C.

As shown in FIGS. 4A to 4C, the reader writer 101 transmits commands for reading or writing the RFIDs periodically at each of timings t0, t2, t4 and t6. In the case where the RFID 201 loaded on a belt conveyor 304 enters an RFID read/write area of the reader writer 101 at the timing t2, the RFID 201 receives a command 2 and can response at a timing t3 (FIG. 4B). Next, in the case where the RFID 201 enters the read/write area of the reader writer 101 at the timing t3, the RFID 201 receives a command 3 transmitted at the timing t4 and tries to response at a timing t5. However, since the RFID 201 is outside of the read/write area of the reader writer 101, the RFID 201 cannot response (FIG. 4C).

As described above, depending on the timing at which the RFID enters the read/write area of the reader writer 101, it becomes impossible to read or write the RFID. Therefore, an object detection sensor such as an infrared sensor has also been attached along with the reader writer to detect the item in advance. After the detection of the item in advance, the reader writer transmits a modulated wave for reading and writing the RFID. The situations are shown in FIGS. 5A and 5B.

In FIGS. 5A and 5B, an object detection sensor 501 is attached along with the reader writer 101. The object detection sensor 501 and the reader writer 101 are controlled by a controller 502. The object detection sensor 501 is disposed so as to detect the RFID 201 immediately before the RFID 201 enters the read/write area of the reader writer 101. For example, the object detection sensor 501 is disposed so as to detect the RFID 201 in timing between t2 and t3, immediately before the timing t3 at which the RFID 201 enters the read/write area of the reader writer 101. After detecting the RFID 201, the object detection sensor 501 notifies the controller 502 of the detection of the RFID. Then, the controller 502 instructs the reader writer 101 to transmit a command 1 for reading and writing the RFID 201. The reader writer 101 transmits the command 1 at the timing t3 and thus can receive a response from the RFID 201.

In the case of reading and writing the RFID 201 brought nonperiodically, the reader writer 101 cannot grasp the transmission timing of the modulated wave for reading and writing the RFID 201. Therefore, the RFID 201 cannot read or write the RFID 201, and the RFID 201 passes through the read/write area of the reader writer 101 without being read or written sometimes.

And, even if the above detection error of the RFID 201 is avoided by disposing the RFID system and the object detection sensor 501, it is easily conceivable that presence of the object detection sensor 501 may complicate control of the system and also may increase production cost.

Therefore, an object of the present invention is to provide a technology that enables a reader writer to detect an RFID without using an object detection sensor to transmit a modulated wave for reading and writing the RFID at an appropriate timing.

The above and other objects and novel features of the present invention will become apparent from the description of the present specification and the accompanying drawings.

Among aspects of the invention disclosed in the present application, a summary of typical aspects thereof will be briefly explained below.

Using a nonlinearity of a rectifier or a demodulator in an IC chip of the RFID, the reader writer transmits continuous or modulated waves having two or more different frequencies. The RFID receives the continuous or modulated waves having two or more different frequencies to generate a harmonics intermodulation product in the rectifier or the demodulator in the IC chip. And the reader writer receives the harmonics intermodulation product. Thus, the RFID can be detected and a modulated wave for reading and writing the RFID can be transmitted without any special object detection sensor.

Advantages obtained by the typical aspects of the invention disclosed in the present application will be briefly explained as follows:

(1) A reader writer can detect an RFID and transmit a modulated wave (command) for reading and writing the RFID at an appropriate timing so as to read and write the RFID.

(2) The reader writer can detect the RFID regardless of the type and communication method of the RFID.

BRIEF DESCRIPTIONS OF THE DRAWINGS

DESCRIPTIONS OF THE PREFERRED EMBODIMENTS

Hereinafter, embodiments of the present invention will be explained in detail with reference to the accompanying drawings. In all of the drawings for explaining the embodiments, the same members are denoted by the same reference symbols in principle and repetitive descriptions thereof will be omitted.

First Embodiment

Figure 1A:
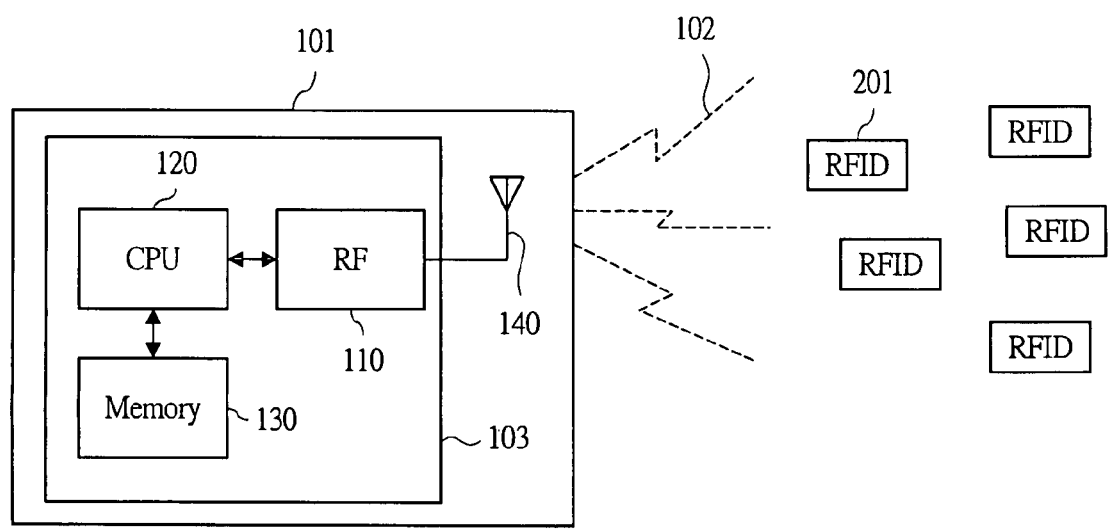
FIG. 1A is a diagram showing a structure of an ordinary RFID system.
Figure 1B:
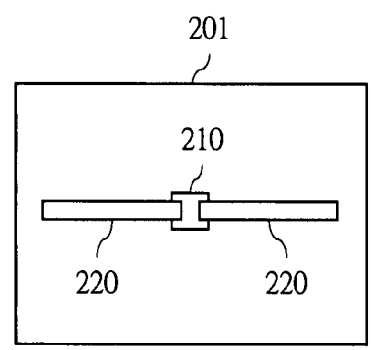
FIG. 1B is a diagram showing a structure of an ordinary RFID system.
Figure 2:
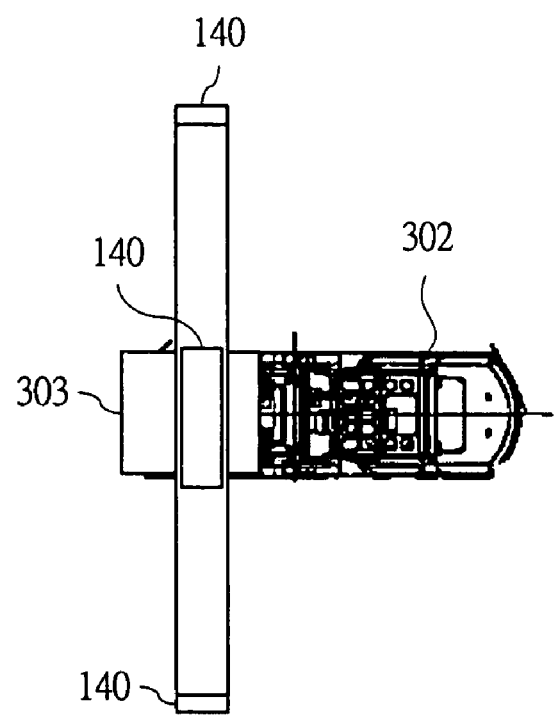
FIG. 2 is a diagram showing an RFID system in which a reader writer reads and writes an RFID when the RFID attached to an item is carried by a forklift truck.
Figure 2:
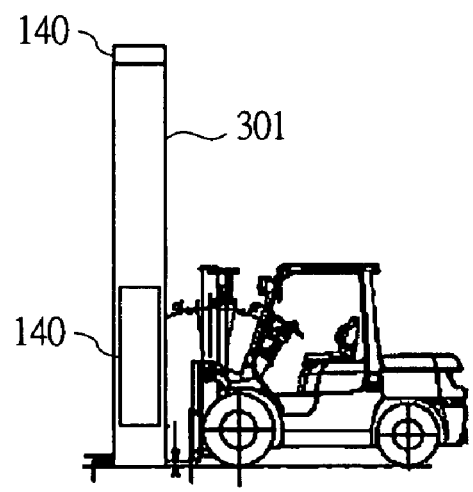
Figure 3:
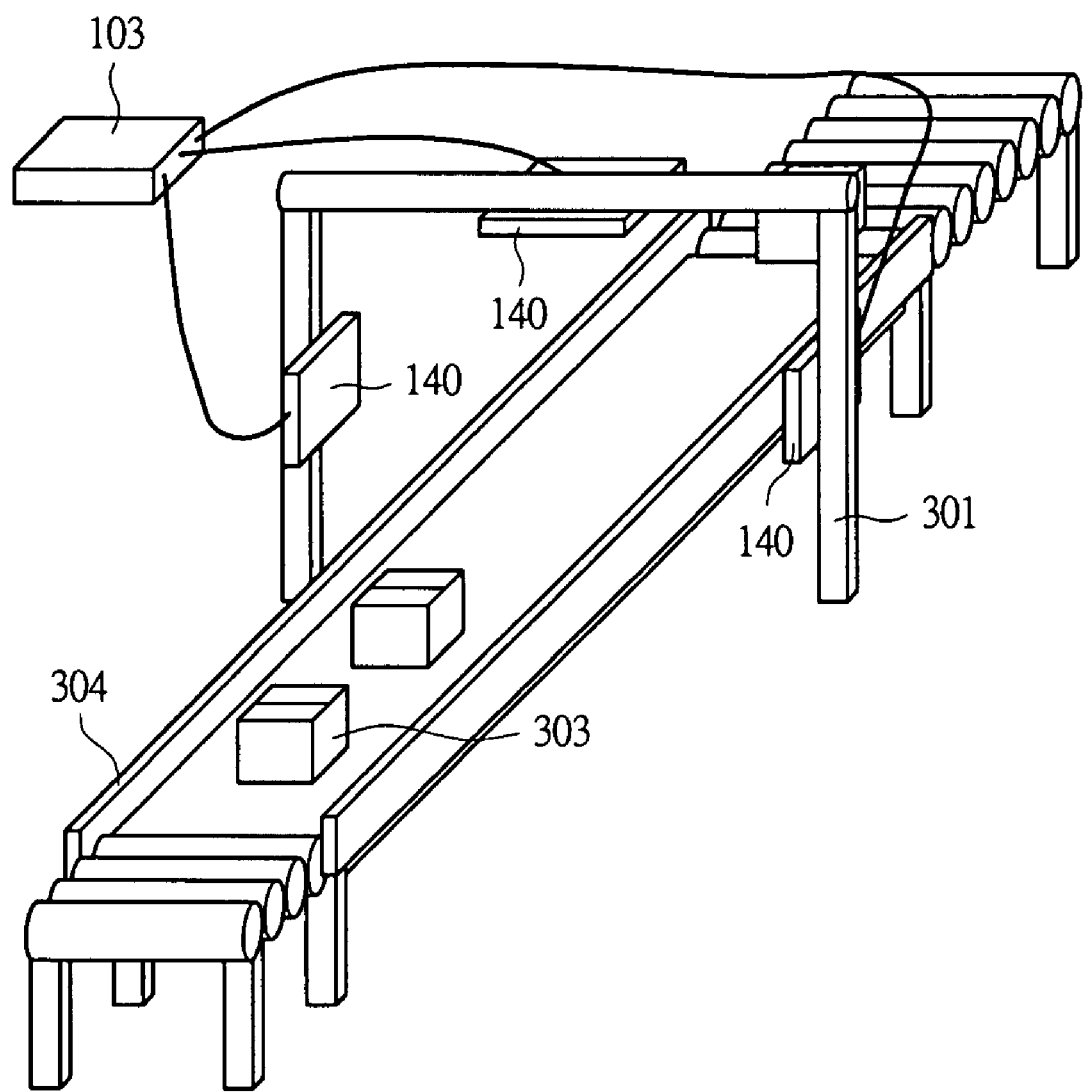
FIG. 3 is a diagram showing an RFID system in which a reader writer reads and writes an RFID when the RFID attached to an item is moving by a belt conveyor.
Figure 4A:
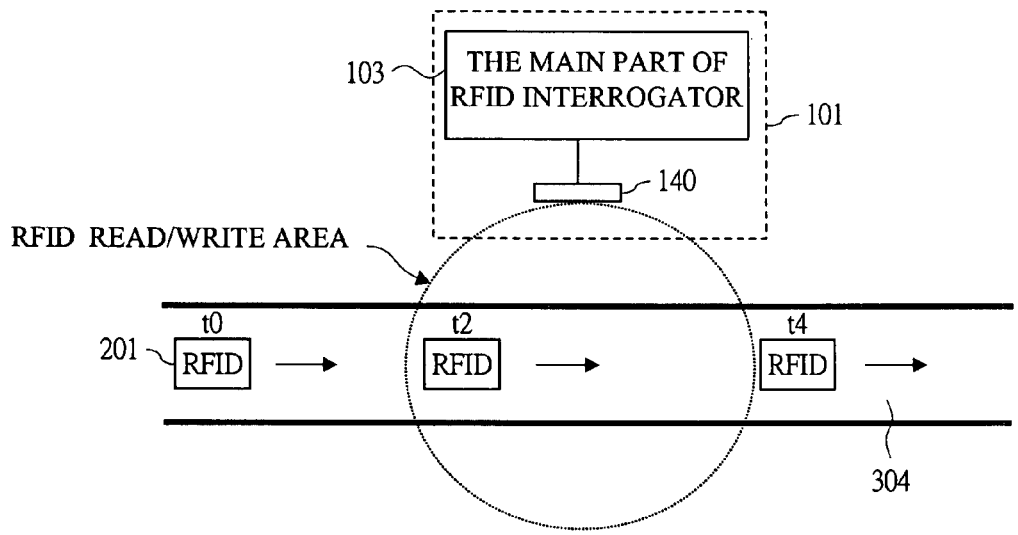
FIG. 4A is a diagram showing a timing at which a reader writer reads and writes an RFID moving a the belt conveyor.
Figure 4B:
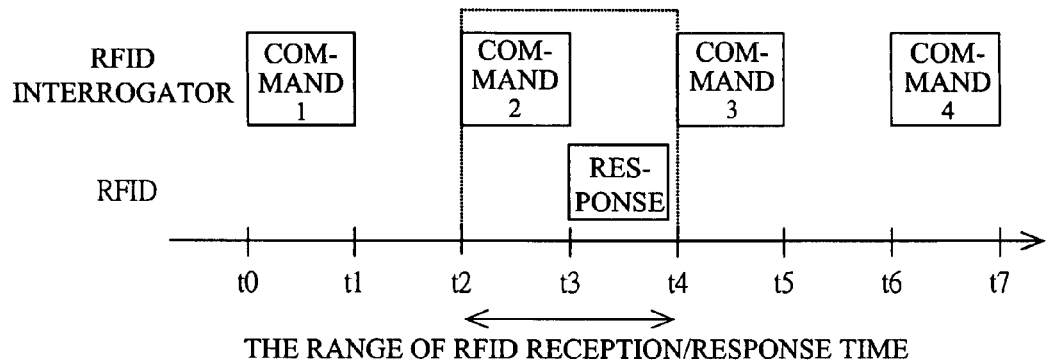
FIG. 4B is a diagram showing the timing at which the reader writer reads and writes the RFID moving by the belt conveyor.
Figure 4C:
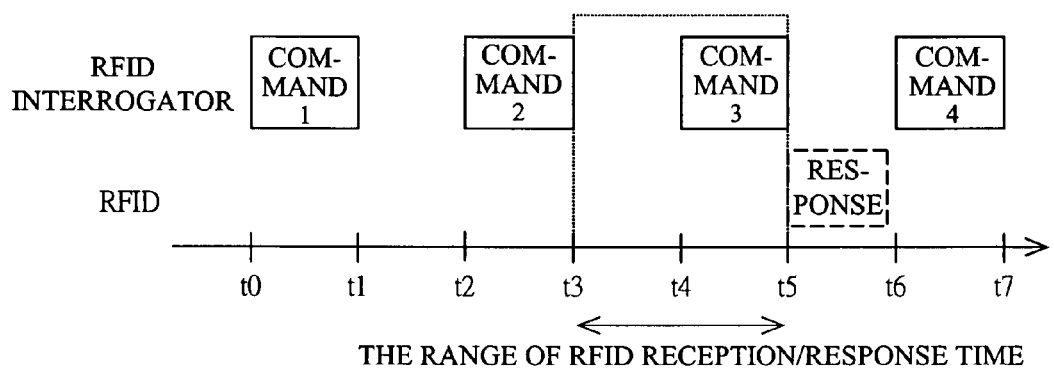
FIG. 4C is a diagram showing the timing at which the reader writer reads and writes the RFID moving by the belt conveyor.
Figure 5A:
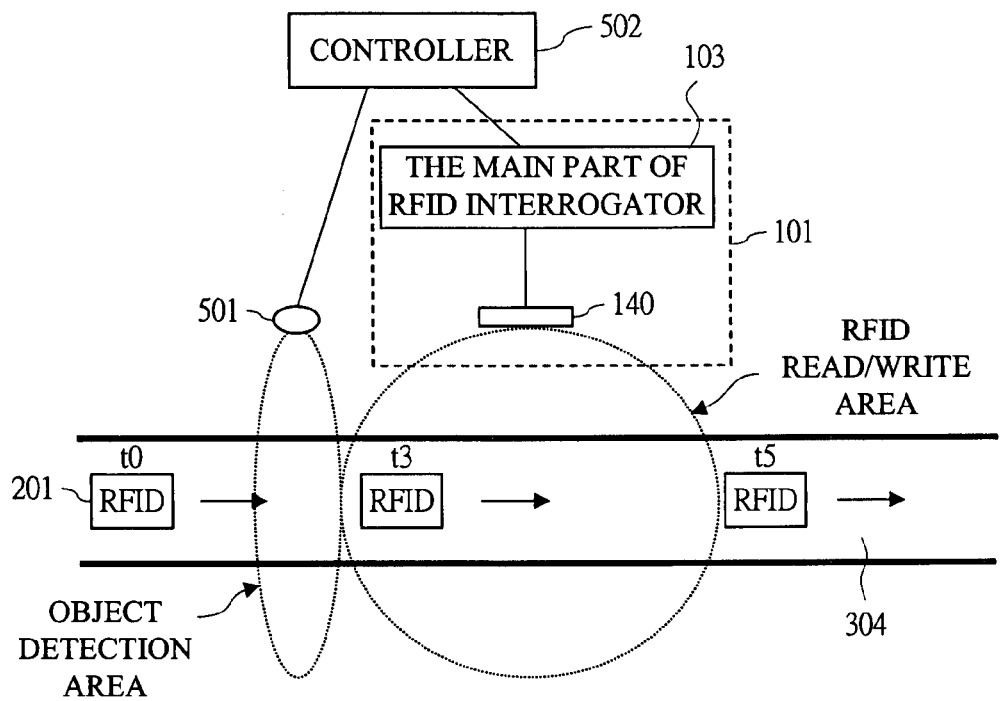
FIG. 5A is a diagram showing a timing at which, using an object detection sensor, a reader writer reads and writes an RFID moving by a belt conveyor.
Figure 5B:
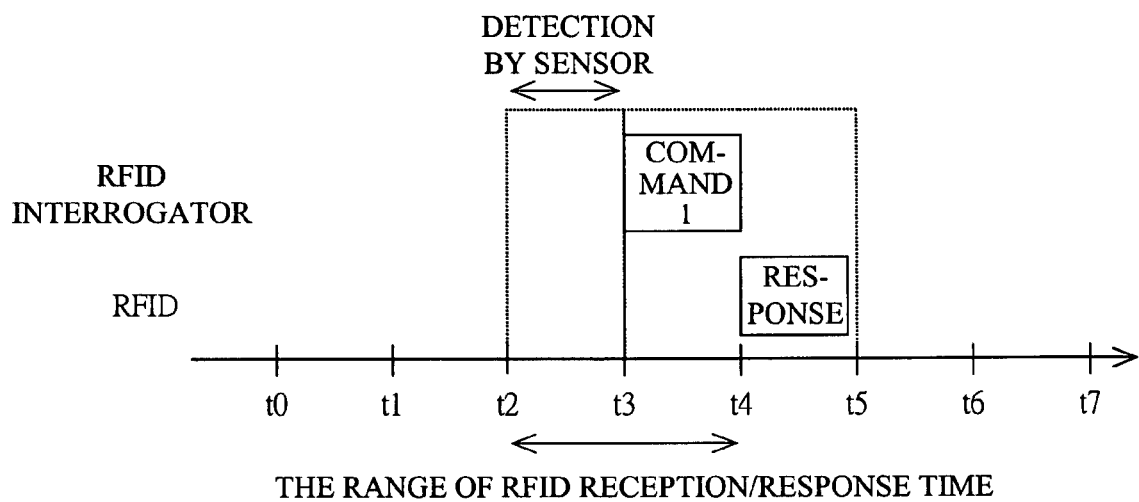
FIG. 5B is a diagram showing the timing at which, using the object detection sensor, the reader writer reads and writes the RFID moving by the belt conveyor.
Figure 6:
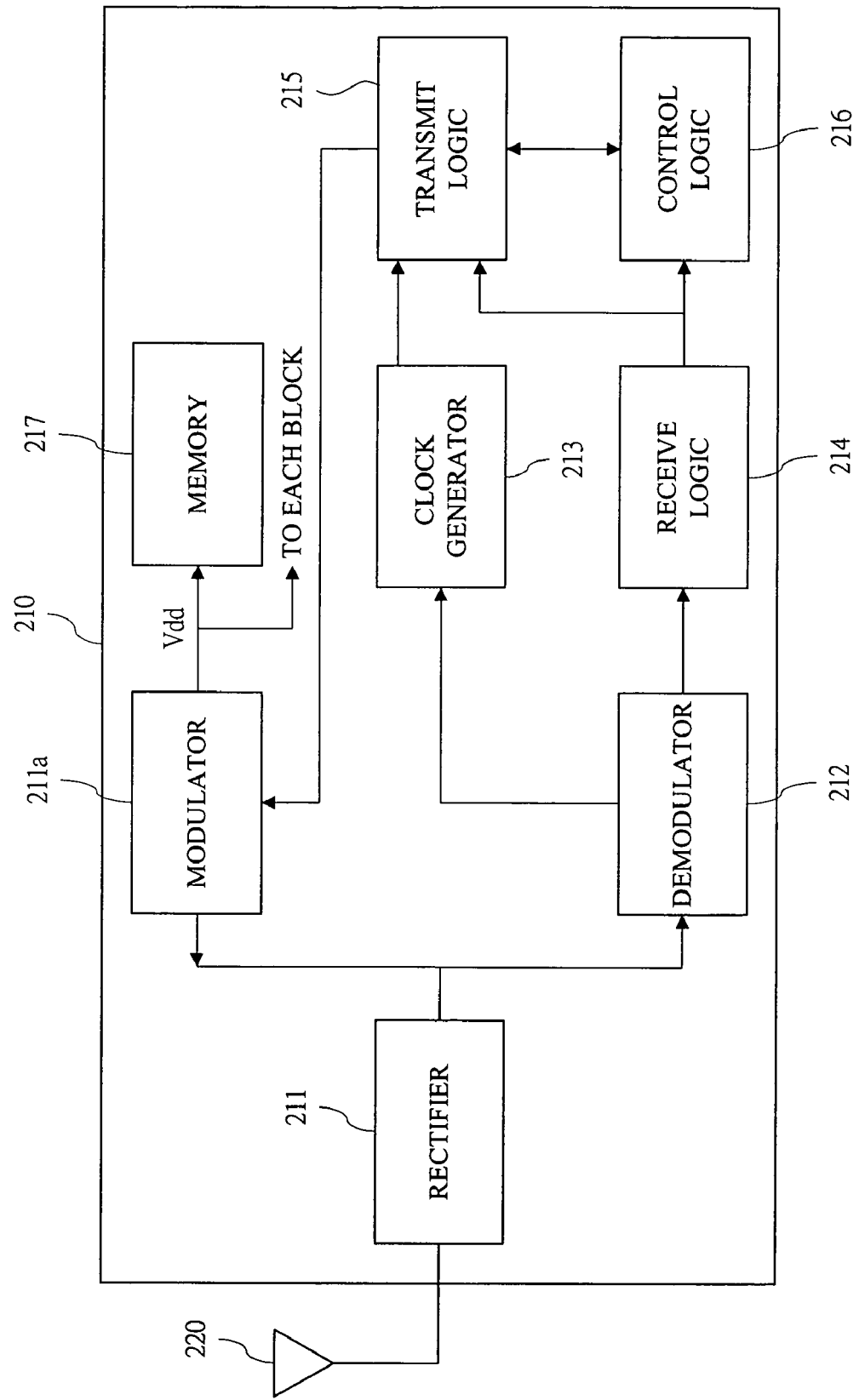
FIG. 6 is a block diagram showing a structure of an RFID according to a first embodiment of the present invention.

FIG. 6 shows a block diagram of an RFID according to a first embodiment of the present invention. The RFID is composed of an IC chip 210 and an antenna 220. The IC chip 210 includes a rectifier/modulator 211, a modulator 211a, a demodulator (for data generation) 212, a clock generator 213, a receive logic 214, a transmit logic 215, a control logic 216, a memory 217 and the like. Depending on a type of the RFID, a battery may be included in addition to these components.

Since a so-called passive RFID including no battery operates using electromagnetic waves output from a reader writer as operating power, a voltage Vdd is supplied to each block of the IC chip 210 through the rectifier of the IC chip.

Figure 7:
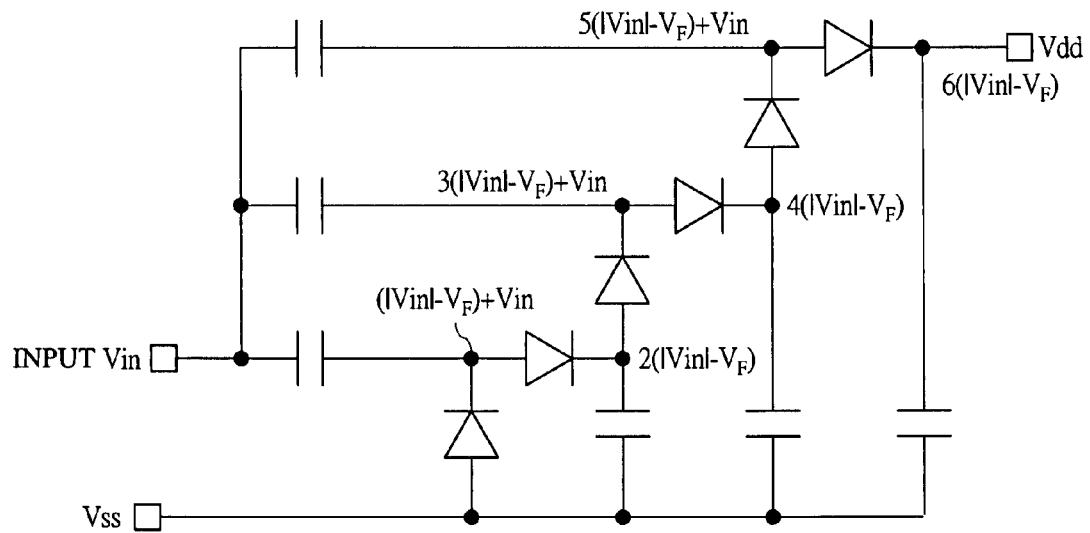
FIG. 7 is a diagram showing a rectifier in a circuit of an IC chip of the RFID according to the first embodiment of the present invention.

FIG. 7 shows an ordinary circuit of the rectifier. The rectifier is comprised of a diode and a capacitance, and boosts a voltage from a weak level to an operational level. In this case, since the diode is a nonlinear element, if a voltage input to the nonlinear element is assumed to be Vi and an output voltage therefrom is assumed to be Vout, the Vi and Vout can be expressed by a following formula (1).

In addition, in a so-called active RFID including a battery, although a case in which no rectifier is included exists sometimes, a demodulator also includes a nonlinear element equivalent to that in a rectifier. Therefore, the formula (1) shows characteristics common among all types of RFIDs.

$$Vout = \alpha_0 + \alpha_1 Vin + \alpha_2 Vin^2 + \alpha_3 Vin^3 + \quad (1)$$

($\alpha_0, \alpha_1, \alpha_2, \alpha_3, \ldots$ : proportional constants determined by characteristics of a nonlinear element)

Here, when the reader writer transmits a continuous or modulated wave having two different frequencies ($\omega_1, \omega_2$) and the RFID receives the continuous or modulated wave having the two frequencies, since the continuous or modulated wave having two different frequencies is input to the modulator 211a or the demodulator 212 in the IC chip 210 from the antenna 220 via the rectifier 211, an output voltage Vout of the diode, which is a nonlinear element is expressed by a following formula (2).

$$Vout = \alpha_0 + \alpha_1(A_1 \cos \omega_1 t + A_2 \cos \omega_2 t) + \alpha_2(A_1 \cos \omega_1 t + A_2 \cos \omega_2 t)^2 + \alpha_3(A_1 \cos \omega_1 t + A_2 \cos \omega_2 t)^3 + \quad (2)$$

By expanding a right side of the formula (2), and removing a DC component and fundamental frequency components $\omega_1$ and $\omega_2$, respective frequency components are obtained as shown in formulas (3) to (9).

$$Vout[\omega_1 \pm \omega_2] = \alpha_2 A_1 A_2 \cos(\omega_1 + \omega_2)t + \alpha_2 A_1 A_2 \cos(\omega_1 - \omega_2)t \quad (3)$$

$$Vout[2\omega_1 \pm \omega_2] = (\tfrac{3}{4})\alpha_3 A_1^2 A_2 \cos(2\omega_1 + \omega_2)t + (\tfrac{3}{4})\alpha_3 A_1^2 A_2 \cos(2\omega_1 - \omega_2)t \quad (4)$$

$$Vout[2\omega_2 \pm \omega_1] = (\tfrac{3}{4})\alpha_3 A_2^2 A_1 \cos(2\omega_2 + \omega_1)t + (\tfrac{3}{4})\alpha_3 A_2^2 A_1 \cos(2\omega_2 - \omega_1)t \quad (5)$$

$$Vout[2\omega_1] = (\tfrac{1}{2})\alpha_2 A_1^2 \cos(2\omega_1)t \quad (6)$$

$$Vout[2\omega_2] = (\tfrac{1}{2})\alpha_2 A_2^2 \cos(2\omega_2)t \quad (7)$$

$$Vout[3\omega_1] = (\tfrac{1}{4})\alpha_3 A_1^3 \cos(3\omega_1)t \quad (8)$$

$$Vout[3\omega_2] = (\tfrac{1}{4})\alpha_3 A_2^3 \cos(3\omega_2)t \quad (9)$$

Figure 8:
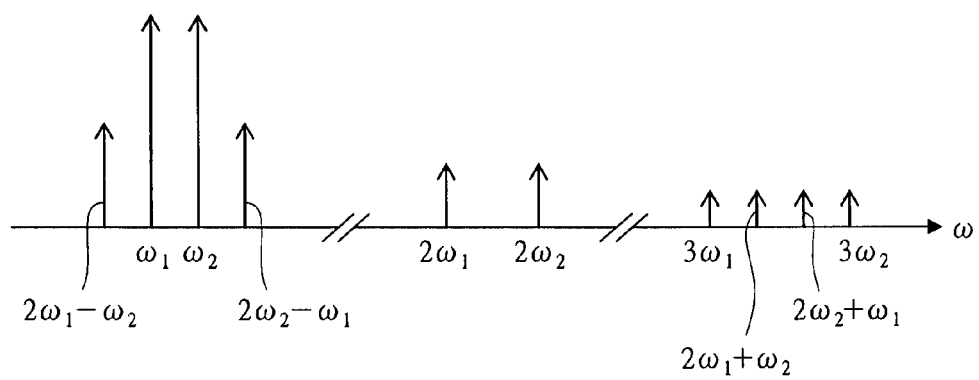
FIG. 8 is a diagram showing frequency characteristics obtained when the RFID receives continuous wave having two different frequencies from a reader writer to generate an intermodulation product, according to the first embodiment of the present invention.

FIG. 8 is a diagram representing the formulas (3) to (9) with reference to a frequency axis. Note that, FIG. 8 is a concept diagram and does not precisely show a level of each frequency. As shown, it can be understood that the RFID receives the continuous or modulated waves having two different frequencies ($\omega_1$, $\omega_2$) output from the reader writer and various intermodulation products according to a nonlinearity of the IC chip circuit are generated to transmitted through the antenna.

The reader writer can detect the RFID by receiving the intermodulation products transmitted from the RFID along with transmitting continuously the continuous or modulated waves having the two different frequencies ($\omega_1$, $\omega_2$).

Usually, it seems to be general to receive $2\omega_1-\omega_2$ and $2\omega_2-\omega_1$, which are third-order intermodulation components near a transmission frequency, because the receive circuit of the reader writer thereof is simple. However, other intermodulation products may be received. Furthermore, although the present embodiment employs the example in which the reader writer transmits the continuous or modulated waves having two different frequencies, the invention is not restricted thereto. Because the RFID can generate intermodulation products even in the case of three or more different frequencies.

Thus, the reader writer can detect the RFID without any special object detection sensor.

Figure 9:
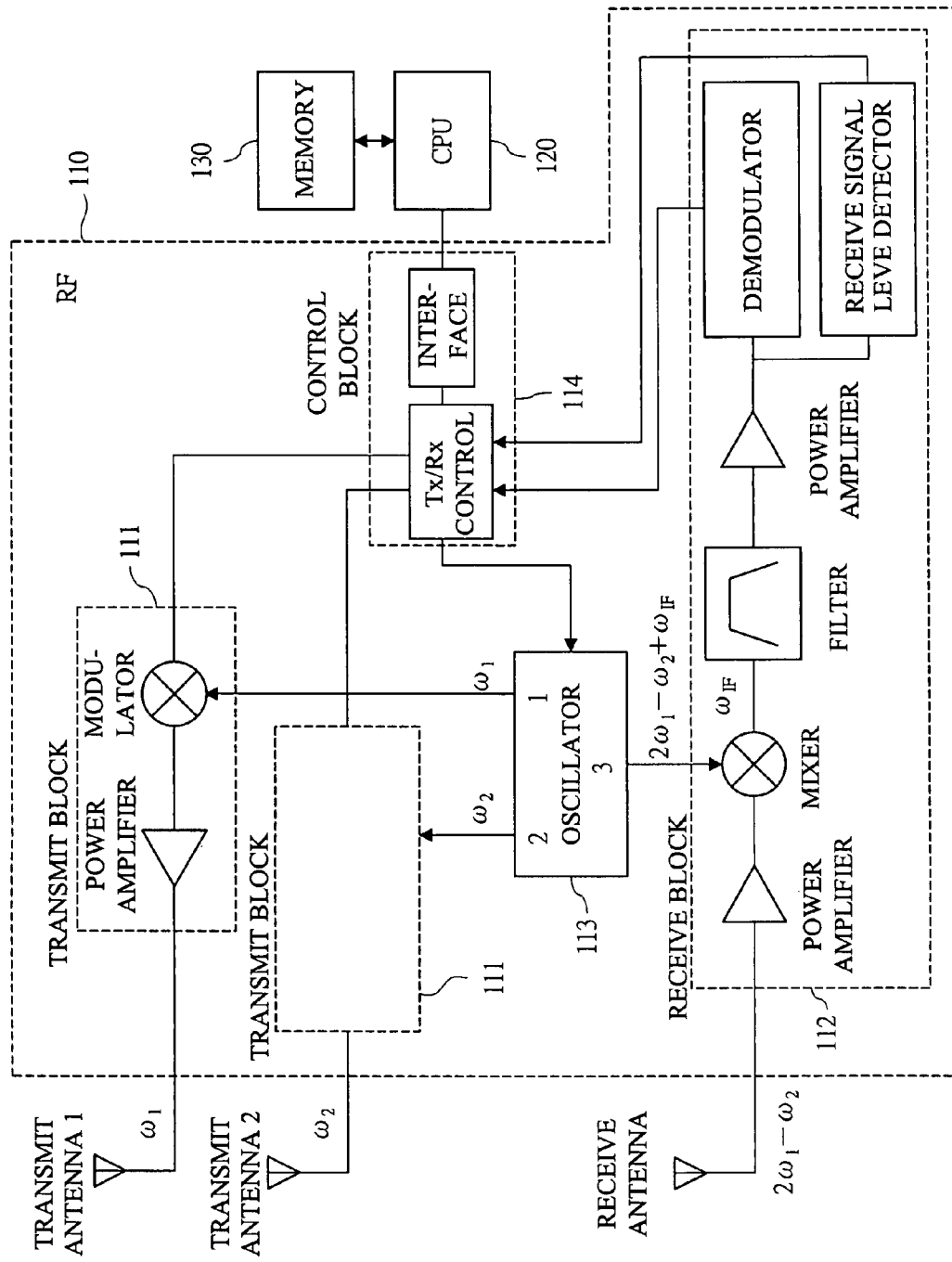
FIG. 9 is a block diagram showing a structure of the reader writer according to the first embodiment of the present invention.
Figure 10:
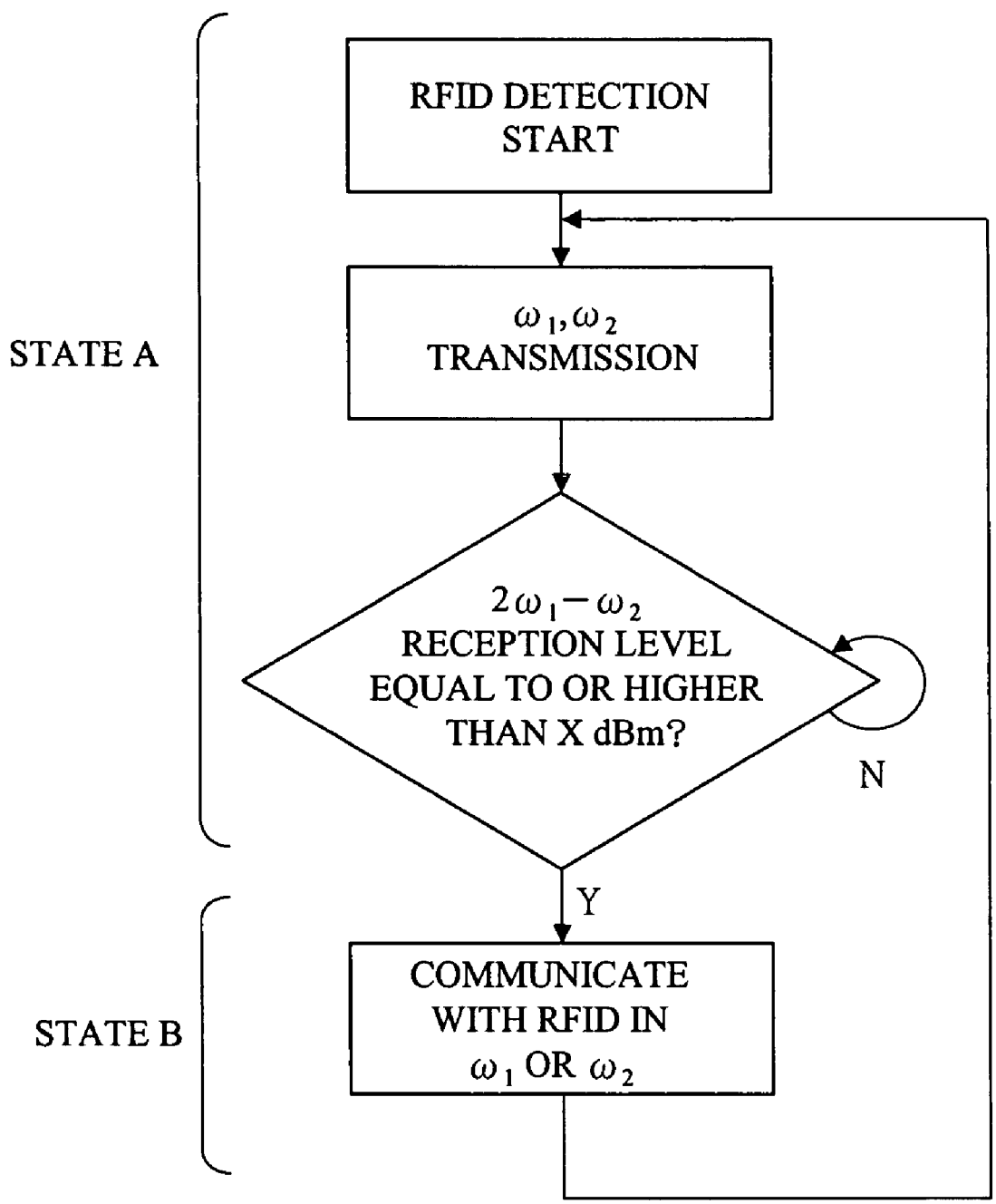
FIG. 10 is a flowchart showing processings performed by the reader writer according to the first embodiment of the present invention.

FIG. 9 is a block diagram of a structural example of the reader writer and FIG. 10 is a flowchart of processings performed by the reader writer. In a state A of FIG. 10, since the reader writer simultaneously transmits continuous or modulated waves having two different frequencies ($\omega_1$, $\omega_2$), the frequencies $\omega_1$ and $\omega_2$ are output from an oscillator 113 to two transmit blocks 111 by control from a control block 114. And the transmit blocks 111 execute an output processing using the two different frequencies as carrier frequencies through transmit antennas 1 and 2.

In a reception by the reader writer, a frequency $2\omega_1-\omega_2$ received by a receive antenna is amplified by an amplifier in a receive block 112. Then, a frequency $2\omega_1-\omega_2+\omega_{IF}$ is output from the oscillator 113 by control from the control block 114. A mixer executes a frequency transform for the output from the amplifier into an intermediate frequency ($\omega_{IF}$), then, the output from the mixer is input to a demodulator and a receive signal level detector through a filter and an amplifier. If a level of the $\omega_{IF}$ is equal to or higher than X dBm, the reader writer transits to a state B and communicates with the RFID. If the level is lower than X dBm, the reader writer remains in the state A and continues to transmit the $\omega_1$, $\omega_2$ and receive the $2\omega_1-\omega_2$.

In the state B, the reader writer performs normal communication with the RFID. Here is shown an example of communication with the RFID using the frequency $\omega_1$. When the reader writer transits to the state B, the frequency $\omega_1$ is output from ports 1, 2 of the oscillator 113 by control from the control block. Then, an operation of modulation or non-modulation for the output is executed and a modulated wave or a continuous wave of the $\omega_1$ is output from the transmit antennas 1 and 2. In a reception of the RFID, since the $\omega_1$ is received from the receive antenna, $\omega_1+\omega_{IF}$ is output from a port 3 of the oscillator 113, the received wave $\omega_1$ and the $\omega_1+\omega_{IF}$ are mixed, and a frequency transform into $\omega_{IF}$ is executed. Thereafter, the output is input to the demodulator and the receive signal level detector through the filter and the amplifier. The demodulator performs a data detection and the communication with the RFID is performed.

Figure 11A:
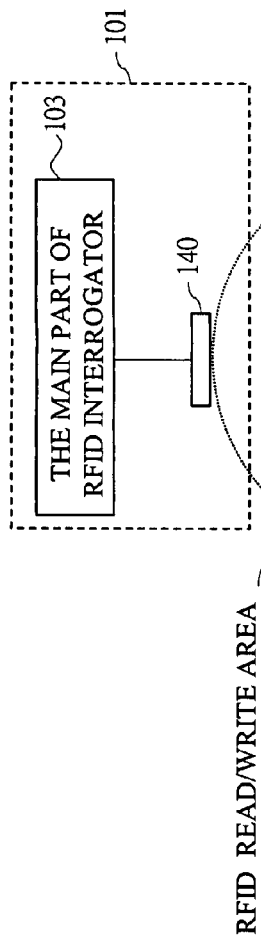
FIG. 11A is a diagram showing timings of a detection, a read, and a write of the RFID using the reader writer according to the first embodiment of the present invention.
Figure 11B:
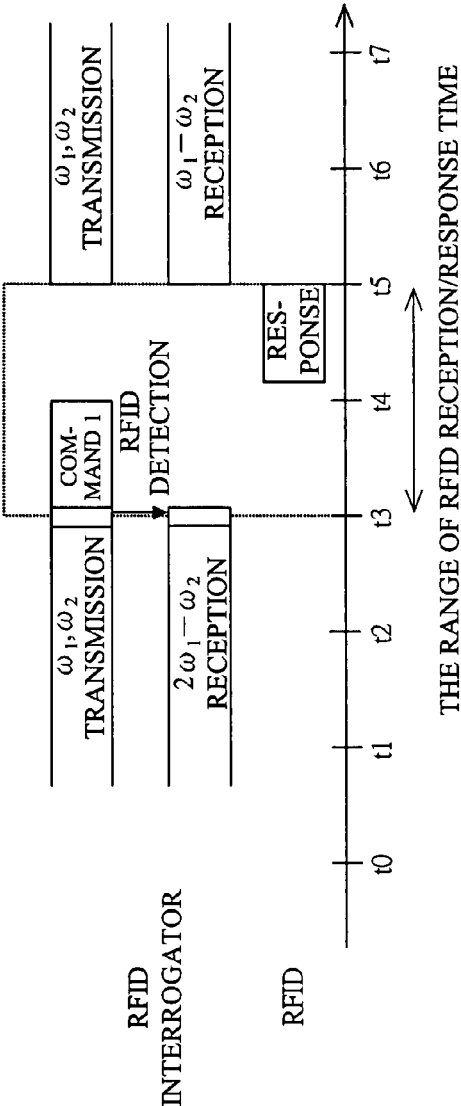
FIG. 11B is a diagram showing the timings of a detection, a read, and a write of the RFID using the reader writer according to the first embodiment of the present invention.

Hereinabove, it has been shown that the reader writer can detect the RFID. Now, an operational example of the reader writer after detecting the RFID is shown in FIG. 11.

The reader writer 101 is adapted to receive $\omega_1-\omega_2$ simultaneously with transmitting the frequencies $\omega_1$ and $\omega_1$ continuously. When the RFID 201 enters the read/write area of the reader writer 101, the RFID 201 transmits a third-order intermodulation wave $2\omega_1-\omega_2$. Therefore, the reader writer 101 receives the $2\omega_1-\omega_2$ and detects that the RFID 201 is located in the read/write area. Accordingly, the reader writer 101 transmits a command to the RFID 201 and receives a response to the command from the RFID 201. Thereafter, the reader writer 101 transmits continuously the frequencies $\omega_1$ and $\omega_2$ to detect another RFID 201 subsequently.

The example in which the reader writer transmits the two different frequencies and receives the third-order intermodulation product $2\omega_1-\omega_2$ to detect the RFID is shown here. However, the reader writer may receive another intermodulation product (for example, $2\omega_2-\omega_1$, $2\omega_1+\omega_2$, $2\omega_2+\omega_1$ or the like) to detect the RFID. In addition, the reader writer may output two or more frequencies or a single frequency and receive an intermodulation product or harmonics transmitted from the RFID to detect the RFID.

An example in which a single frequency is transmitted by a reader writer is shown in a following second embodiment of the invention.

Second Embodiment

In the first embodiment described above, the example in which the reader writer outputs the two different frequencies to detect the RFID is employed. However, if the reader writer can outputs only a single frequency, due to a nonlinearity of the IC chip of the RFID, an output voltage Vout is expressed as shown in a formula (10).

$$V_{out}=\alpha_0+\alpha_1 A_1 \cos \omega_1 t+\alpha_2(A_1 \cos \omega_1 t)^2+\alpha_3(A_1 \cos \omega_1 t)^3 \quad (10)$$

By expanding a right side of the formula (10) and removing a DC component and a fundamental frequency component $\omega_1$, frequency components with a two or three times frequency of the fundamental frequency are output, as shown in formulas (11) and (12).

$$V_{out}[2\omega_1]=(\tfrac{1}{2})\alpha_2 A_1^2 \cos(2\omega_1)t \quad (11)$$

$$V_{out}[3\omega_1]=(\tfrac{1}{4})\alpha_3 A_1^3 \cos(3\omega_1)t \quad (12)$$

Figure 12:
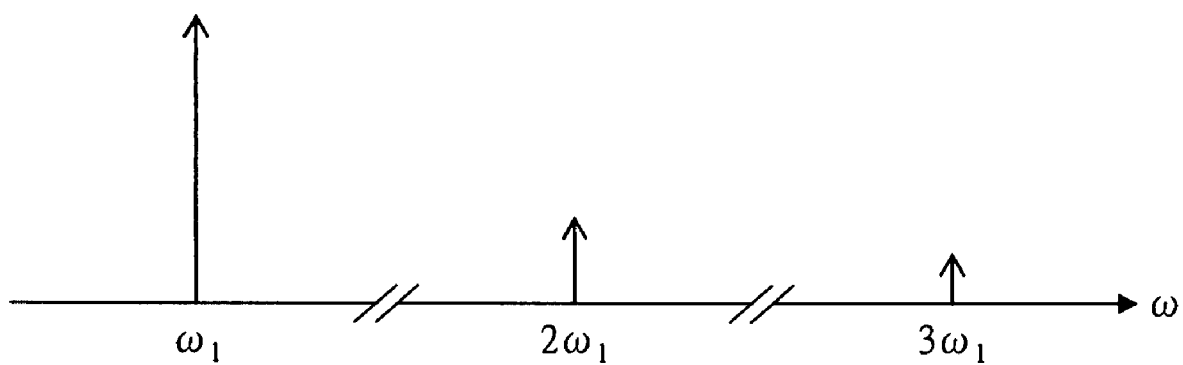
FIG. 12 is a diagram showing frequency characteristics obtained when an RFID receives a single frequency wave from a reader writer to generate an intermodulation product, according to a second embodiment of the present invention.

FIG. 12 is a diagram representing the formulas (11) and (12) with reference to a frequency axis.

As shown, even if the reader writer outputs the single frequency, harmonics with two or three times frequency of the fundamental frequency is output due to the nonlinearity of the RFID. And, the reader writer can detect the RFID by receiving the harmonics.

Figure 13:
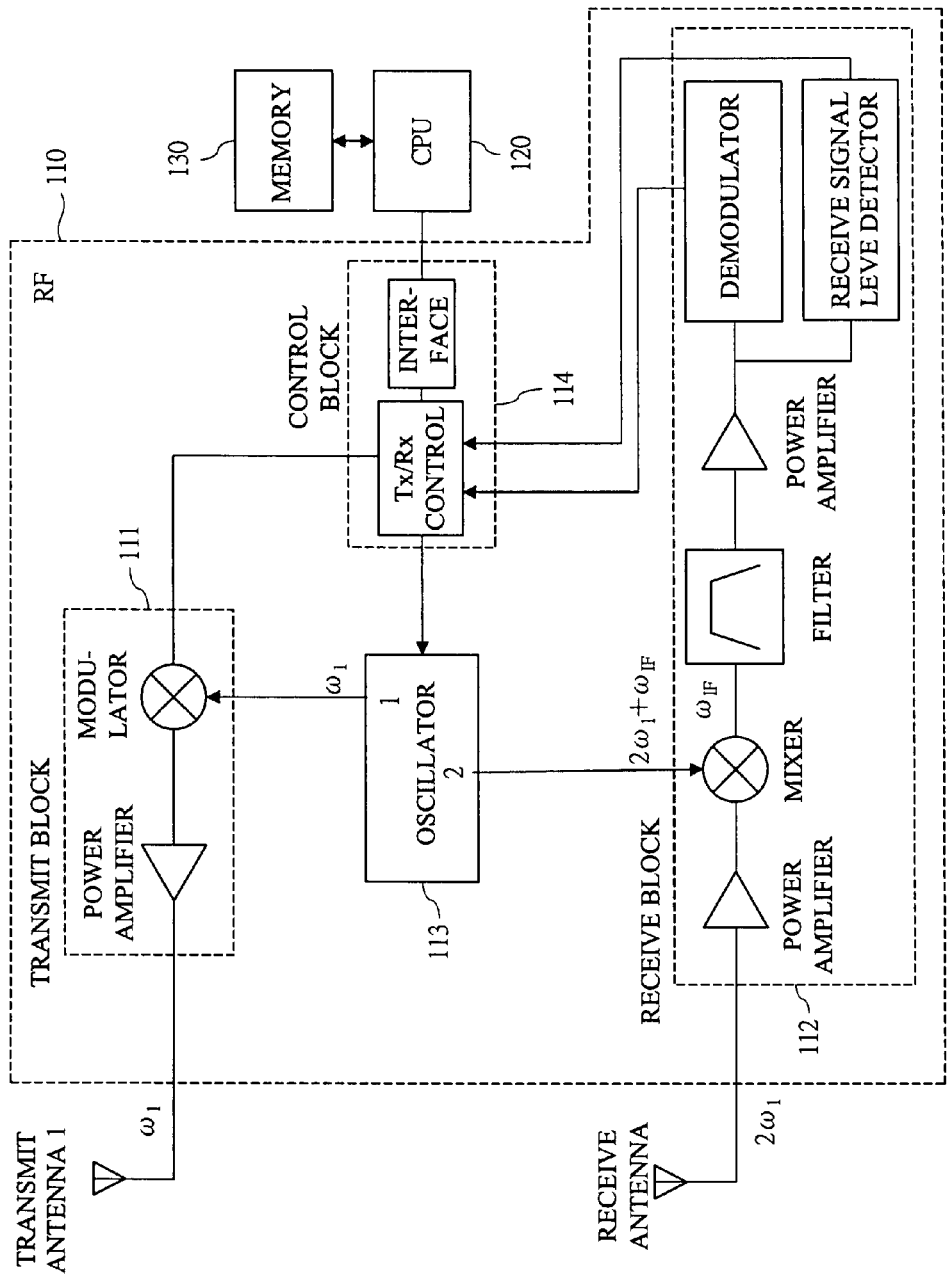
FIG. 13 is a block diagram showing a structure of the reader writer according to the second embodiment of the present invention.
Figure 14:
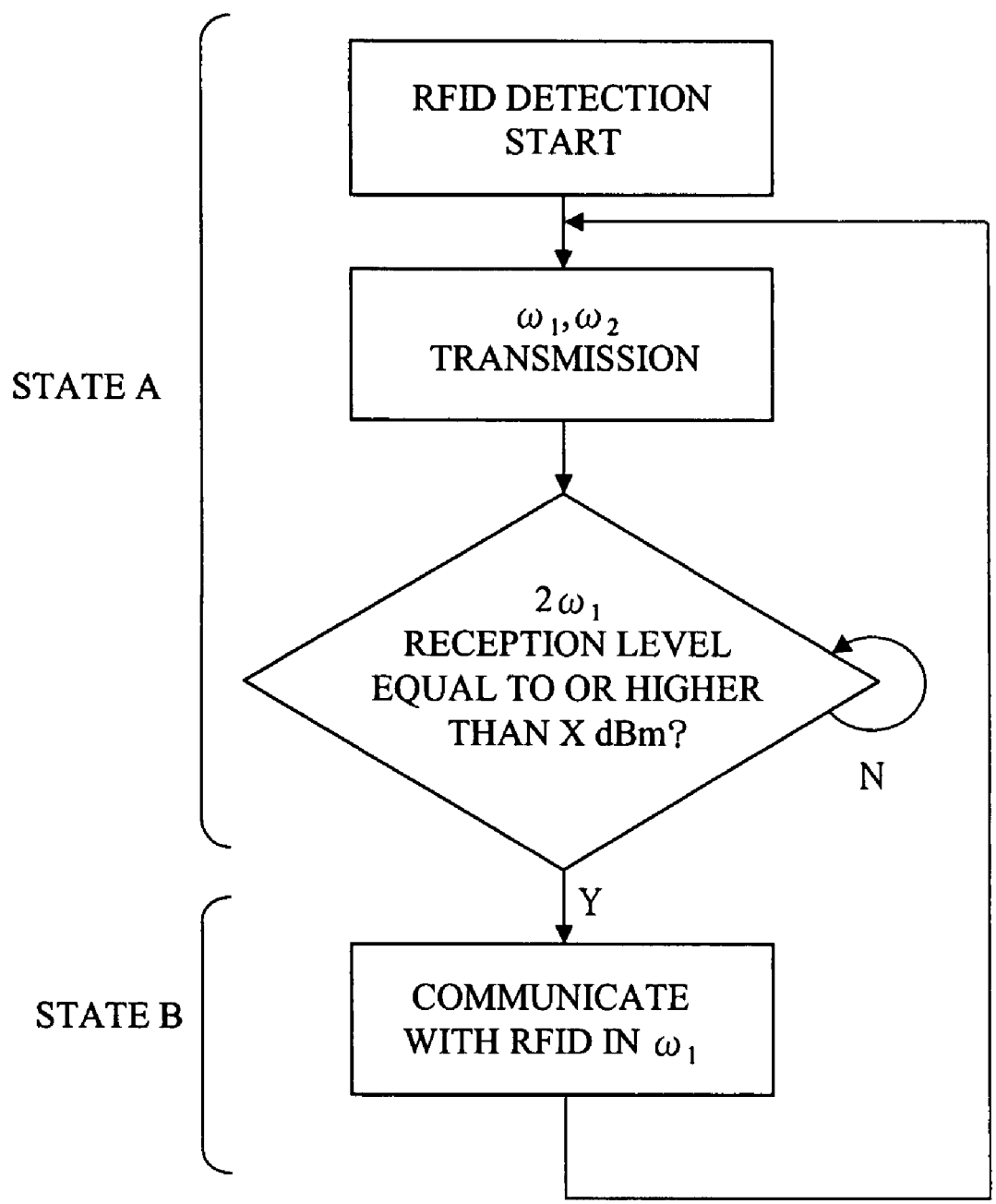
FIG. 14 is a flowchart showing processings performed by the reader writer according to the second embodiment of the present invention.

FIG. 13 shows a block diagram of a structural example of the reader writer, and FIG. 14 shows a flowchart of processings performed by the reader writer. In a state A of FIG. 14, the reader writer outputs a continuous wave with the frequency $\omega_1$ from an oscillator 113 to a transmit block 111 by control from a control block 114, and the transmit block 111 executes an output operation through a transmit antenna 1 using $\omega_1$ as a carrier frequency.

In a reception by the reader writer, a frequency $2\omega_1$ received by a receive antenna is amplified by an amplifier in a receive block 112. Then, a frequency $2\omega_1+\omega_{IF}$ is output from the oscillator 113 by control from the control block 114. A mixer executes a frequency transform for the output into the intermediate frequency ($\omega_{IF}$), then, the output is input to a demodulator and a receive signal level detector through a filter and an amplifier. If a level of the $\omega_{IF}$ is equal to or higher than X dBm, the reader writer transits to a state B and communicates with the RFID. If the level is lower than X dBm, the reader writer remains in the state A and continues to transmit the $\omega_1$ and receive the $2\omega_1$.

In the state B, the reader writer performs normal communication with the RFID. Here is shown an example of communication with the RFID using frequency $\omega_1$. When the reader writer transits to the state B, the frequency $\omega_1$ is output from a port 1 of the oscillator by control from the control block 114. Then, an operation of modulation or non-modulation for the output is executed and the modulated wave or the continuous wave of the $\omega_1$ is output from the transmit antenna 1. In a reception of the RFID, since the $\omega_1$ is received from the receive antenna, $\omega_1 + \omega_{IF}$ is output from a port 2 of the oscillator, the received wave $\omega_1$ and $\omega_1 + \omega_{IF}$ are mixed, and a frequency transform into $\omega_{IF}$ is executed. Thereafter, the output is output to the demodulator and the receive signal level detector through the filter and the amplifier. The demodulator performs a data detection and the communication with the RFID is performed.

Hereinabove, the present invention achieved by the inventors has been explained specifically based on the embodiments thereof. However, the invention is not restricted to those embodiments. It is obvious that various changes and modifications may be made in a scope of the invention without departing from a gist of the invention.

What is claimed is:

1. An RFID system comprising:
   an RFID tag; and
   a reader writer communicating with the RFID tag;
   wherein the reader writer generates either a continuous or modulated wave of first and second frequencies;
   the RFID tag receives either the continuous or modulated wave and generates an intermodulation wave of a frequency different from the first and second frequencies; and continuous or modulated wave of first or second frequencies
   after the reader writer detects presence of the RFID tag by receiving the intermodulation wave, the reader writer responsively transmits a command with only the first frequency to the RFID tag, and receives a response to the command from the RFID tag.

2. The RFID system according to claim 1, wherein the intermodulation wave is a third-order intermodulation wave.

3. The RFID system according to claim 1, wherein the intermodulation wave is generated by either a rectifier or a demodulator in the RFID tag and transmitted through an antenna.

4. The RFID system according to claim 3, wherein the rectifier is comprised of diodes and capacitors.

* * * * *